(12) United States Patent
Hämäläinen et al.

(10) Patent No.: US 7,136,627 B2
(45) Date of Patent: Nov. 14, 2006

(54) TRANSMISSION DIVERSITY WITH TWO CROSS-POLARISED ANTENNAS ARRAYS

(75) Inventors: Jyri K. Hämäläinen, Oulu (FI); Risto Wichman, Helsinki (FI)

(73) Assignee: Nokia Corporation, Espoo (FI)

( * ) Notice: Subject to any disclaimer, the term of this patent is extended or adjusted under 35 U.S.C. 154(b) by 128 days.

(21) Appl. No.: 10/520,479

(22) PCT Filed: Aug. 5, 2002

(86) PCT No.: PCT/IB02/03029

§ 371 (c)(1),
(2), (4) Date: Jan. 7, 2005

(87) PCT Pub. No.: WO2004/015887

PCT Pub. Date: Feb. 19, 2004

(65) Prior Publication Data

US 2005/0260954 A1    Nov. 24, 2005

(51) Int. Cl.
*H04B 7/02* (2006.01)
(52) U.S. Cl. ............... 455/101; 455/562.1; 455/575.7; 455/63.4
(58) Field of Classification Search ........... 455/101, 455/562.1, 575.7, 63.4
See application file for complete search history.

(56) References Cited

U.S. PATENT DOCUMENTS

| | | | |
|---|---|---|---|
| 6,754,473 B1* | 6/2004 | Choi et al. | 455/101 |
| 6,801,790 B1* | 10/2004 | Rudrapatna | 455/562.1 |
| 6,990,137 B1* | 1/2006 | Smee et al. | 375/142 |
| 2003/0050020 A1* | 3/2003 | Erceg et al. | 455/101 |
| 2003/0162566 A1* | 8/2003 | Shapira et al. | 455/561 |
| 2004/0127175 A1* | 7/2004 | Lucidarme et al. | 455/101 |
| 2005/0042988 A1* | 2/2005 | Hoek et al. | 455/69 |

FOREIGN PATENT DOCUMENTS

| | | |
|---|---|---|
| EP | 1 003 297 A2 | 5/2000 |
| WO | WO 98/39856 | 9/1998 |

OTHER PUBLICATIONS

Ibsen M. et al. "All-Fibre DFB Laser WDM Transmitters With Integrated Pump Redundancy"; 25 European Conference On Optical Communication; Nice, France, Sep. 27-30, 1999; pp. I-74 to I-75.

(Continued)

*Primary Examiner*—Nay Maung
*Assistant Examiner*—Alejandro Rivero
(74) *Attorney, Agent, or Firm*—Squire, Sanders and Dempsey, LLP.

(57) ABSTRACT

A method for selecting a diversity mode to be applied by a transmitter having two cross-polarized antenna arrays, each representing a diversity branch, comprising the steps of: providing a plurality of diversity mode performance chart look-up tables, mapping a respective individual diversity mode to a respective pair of time correlation value and space correlation value for the two cross-polarized antenna array beams, wherein a respective individual diversity mode is presented by a mapping area, wherein the plurality of performance chart look-up tables is parameterized by an indication of a ratio of received powers from the diversity branches, first selecting one of the performance chart look-up tables dependent on determined ratio of received powers from separate beams, and second selecting one of the individual diversity modes according to the mapping to the determined actual time relation and space correlation values from the first selected performance chart look-up table.

8 Claims, 5 Drawing Sheets

OTHER PUBLICATIONS

Hamalainen J. et al. "Feedback Schemes For FDD WCDMA Systems in Multipath Environments"; VTC 2001; pp. 238-242.
Korhonen, Juha; "Introduction to 3G Mobile Communications"; pp. 86-94.
Miller, Samuel et al., "Transmission Considerations for Polarization-Smart Antennas"; 5 pages.
Shapira, Joseph et al., "A Novel Polarization Smart Antennas"; 5 pages.
3GPP TSG RAN WGI "Verification Algorithm for Closed Loop Transmit Diversity Mode 2"; Meeting #15, Aug. 22-26, 2000, Berlin, Germany; pp. 1-6.
Kraus, John D. "Antennas"; pp. 70-73.

* cited by examiner

TRANSMISSION DIVERSITY WITH TWO CROSS-POLARISED ANTENNAS ARRAYS

FIELD OF THE INVENTION

The present invention relates to a method for selecting a diversity mode to be applied by a transmitter having two cross-polarized antenna arrays.

BACKGROUND OF THE INVENTION

In detail, the present invention relates to the field of transmit antenna diversity. A rather comprehensive introduction to the technical field of diversity is for example given by Juha Korhonen in "Introduction to 3G mobile communications", chapter 3.4., page 86 to 94, Artech House mobile communications series, 2001. More specifically, the concern of this invention resides in a mode selection procedure by which a suitable transmit diversity mode for each link in the cell defined by the coverage area of the subject transmitter can be selected.

It is to be noted that while reference is made to an antenna array, an array comprising a single antenna only may still be regarded as an antenna array. Likewise, an antenna and/or antenna element of the array produces a beam of electromagnetic radiation in operation, i.e. when being driven, and also terms "antenna" and "beam" are used interchangeable, as the antenna configuration and driving will determine the produced beam. It is to be noted further that when considering diversity, a diversity branch can also be represented by the beam produced by the corresponding (diversity) antenna array.

To recapitulate, there are different transmit diversity modes in FDD WCDMA (FDD=Frequency Division Duplex, WCDMA=Wideband Code Divisional Multiple Access) dedicated downlink channels:
1) an open-loop diversity mode using space-time codes such as for example the concept known as STTD (Space-Time Transmit Diversity), and
2) a closed-loop diversity mode, which can be classified into different closed-loop diversity classes:
a) a first class, subsequently referred to as class 1, in which the receiver (e.g. a user equipment UE) returns information to the diversity transmitter (e.g. a Node_B) concerning the relative phase of the received diversity transmission signals; an example for such a class 1 closed-Loop diversity mode is known as closed-loop loop mode 1; and
b) a second class, subsequently referred to as class 2, in which the receiver returns information to the diversity transmitter concerning the relative phase and the ratio of received powers of the received diversity transmission signals; an example for such a class 2 closed-loop diversity mode is known as closed-loop mode 2 (as for example described in the above cited book by Juha Korhonen or as described by 3GPP TS 25.214: "Physical Layer Procedures (FDD)").

It is to be noted that closed-loop diversity is only applicable to a downlink channel if there is an associated uplink channel which is required to return the feedback information. An example for such a channel combination is represented by the DPCH (Dedicated Physical CHannel)/DPCCH (Dedicated Physical Control CHannel) channels.

First, the present transmit diversity methods in WCDMA are recalled. The present (standardized) Transmit Diversity Methods in FDD WCDMA dedicated downlink channels are, as mentioned herein before, for example STTD (Space-Time Transmit Diversity) as an open-loop solution utilizing a simple 2×2 space-time code,
closed-loop mode 1 (CL1) as an example for class 1 closed-loop diversity according to which the relative phase between transmitted signals is adjusted based on the feedback from the receiver (user equipment), and
in closed-loop mode 2 (CL2) as an example for class 2 closed-loop diversity according to which both, relative phase and power between transmitted signals, are adjusted based on the feedback from the mobile.

The Node_B as the transmitter (corresponding in its functionality to a base station BS known from GSM system) can select the mode to be used for each link separately or it can use the same mode for all links in the cell. In this invention, however, the former case is studied, since the latter solution is not recommended because it does not utilize the available capacity potential.

Generally, the mode selection problem resides in finding measures and a method by which a best suitable mode can be selected for each link. A "best suitable mode" can be determined as the mode which reveals the best performance (e.g. lowest bit error rate, lowest S/N (signal to noise) ratio, or the like).

The mode selection problem is linked to the employed antenna solution at the transmitter. The present transmit diversity modes are designed by assuming that the average received powers at the receiver side (UE) from separate transmitter (Node_B) antennas are the same. Thus, if average power of signals received at the UE and originating from an antenna Ant1 is denoted by P1 and average power of signals received at the UH and originating from antenna Ant2 is denoted by P2, so that the ratio thereof, P1/P2=1. When this assumption holds, the performance of the closed-loop schemes depends in a certain manner on the feedback delay and on the spatial correlation between transmit antennas. If the ratio P1/P2 is not equal to unity, then the sensitivity of closed-loop modes to the feedback delay and spatial correlation between transmit antennas will be different than in case P1/P2=1. This can be illustrated by a simple example. If transmitter selection combining is used, then the signal is transmitted trough the antenna which provides better channel. Feedback information from a mobile directs the transmit antenna selection. If P1/P2=1 in the receiver, then both received channels are in good state with equal probability and system performance depends on the feedback delay and transmit antenna correlation. If feedback delay is large when compared to channel coherence time, then system performance is corrupted. Similarly, if transmit antennas correlate heavily, then both antennas are in good and bad states simultaneously and the lack of diversity corrupts the system performance. However, if P1/P2 is all the time very high—or very low—then the same antenna provides better channel almost all the time and feedback delay or antenna correlation are not corrupting the system performance much. The effect of P1/P2 is not the same to all transmit diversity modes and therefore it should be taken into account when transmit diversity mode is selected.

In FIG. 1 there is a sketch concerning to the selection problem, when average received powers from separate BS antennas in MS are equal: areas A, B and C (also referred to as Mapping areas) consist of those spatio-temporal correlation value pairs (spatial correlation SC, temporal correlation TC), for which open-loop mode (e.g. STTD), class 1 closed-loop mode (e.g. CL1) and class 2 closed-loop mode (e.g. CL2), respectively, provide the best performance. Apparently, the open-loop mode (STTD) is the best choice in most cases while the operating area of class 2 closed-mode is marginal: class 2 is suitable on ly when time correlation (TC) is very high. class 1 works well when spatial correlation (SC) is relatively high. It is to be noted that the FIG. 1 is only a sketch.

The assumption that average received powers at the receiver would be equal is well posed, if (a) Transmit antennas are co-polarized (b) Transmit antenna separation is not very large (i.e. antennas, are in the same site, and not, for example, in separate buildings).

The latter restriction (b) is not a problem in practice since the diversity antennas are usually in the same mast. However, assumption (a) has some drawbacks.

The well known fact is that two low correlated signals can be obtained using cross-polarized antennas (and/or antenna arrays). This antenna solution is more compact and cheaper than a pair of spatially separated co-polarized antennas/antenna arrays. Moreover, beside these known advantages, the so-called polarization mismatch can be avoided by using cross-polarized antenna arrays antennas. This is explained in the following.

Polarization Mismatch Problem:

In a conventional system, a single vertically polarized antenna is used at the transmitter side. This arrangement is feasible if receiver antennas are all vertically polarized. However, this will not be the case in practice. It may even happen that receiver antenna polarization is flat, a horizontally oriented ellipse, or the like. Then huge polarization mismatch losses can be faced.

Also, different physical environments preserve the transmitted polarization in a different way and thus, the danger of polarization mismatch depends on the environment; in open areas the probability of a serious mismatch is expected to be high.

The known solution to this problem is the use of cross-polarized polarized antenna arrays and/or antennas. In GSM related solutions, the downlink (DL) signal is transmitted from cross-polarized antenna branches with equal power (each individual diversity antenna corresponds to a transmitting branch). The relative phase between the signals transmitted from each branch is randomly rotated in order to avoid the situation where signals would erase each other for a long time (this may happen if antenna brancnes have strong correlation, for example because of a line-of-sight, (LOS) situation). This solution prevents the total mismatch between the transmitter and receiver polarizations.

The same method as used in GSM is, however, not straightforward to be used in WCDMA, since channel estimation at the receiver UE is based on common p-lot channel (CPICH). However, if downlink transmit diversity is used, then different CPICHs are transmitted from separate antenna branches and cross-polarized antennas can be employed. Stated in other words, via each antenna of the transmit diversity antennas a respective CPICH is transmitted.

The present WCDMA standards specify in a detailed manner the allowed transmit diversity modes and hence, if cross-polarized polarized antennas are used in connection with transmit diversity, then the special properties of this antenna solution must be taken into account in the limits given by standards.

Summarizing, it has to be noted that (a) if co-polarized, spatially separated antennas are used in connection with WCDMA transmit diversity modes, then mode selection can be based on a fixed performance chart such as the one proposed in FIG. 1;

(b) based on compact structure, costs and robustness against polarization mismatch, the use of cross-polarized diversity antennas is a very attractive solution. However, when used, this renders the usage of a fixed performance chart such as the one proposed in FIG. 1 not feasible, as will subsequently be explained.

Special Characteristics of Cross-Polarized Antenna Arrays:

Currently, the present transmit diversity modes are studied based on the assumption that the average received powers at the receiver originating from separate transmitter antennas are equal ($P1/P2=1$). This is, however, not necessarily true for cross-polarized antenna arrays if the XPR (cross-polarization ratio) in the channel is high. This is the case especially in rural environments where orthogonal polarization branches are not mixed well and it has been claimed that XPR is relatively high even in urban outdoor environments (See for example Shapira J. and Miller S. in "A novel polarization smart antenna"VTC, May 2001, or in "Transmission Considerations for polarization-smart antennas"VTC, May 201. See also "Method and System For Improving Communication" by Shapira J. and Miller S., International Patent Application WO 98/39856).

Thus, although there might be low correlation between BS antenna branches, the average received power at the receiver from cross-polarized BS antenna branches can be different ($P1 \neq P2$); this renders the usage of a fixed performance chart such as the one proposed in FIG. 1 not feasible, or at least its usage will result in a non-optimum diversity mode selection.

SUMMARY OF THE INVENTION

Consequently, it is an object of the present invention to provide an improved method for selecting a diversity mode to be applied by a transmitter having two cross-polarized antenna arrays, each representing a diversity branch, for transmission diversity, which is free from the above mentioned drawback.

According to the present invention, the above object is for example achieved by a method for selecting a diversity mode to be applied by a transmitter having two cross-polarized antenna arrays, each representing a diversity branch, for transmission diversity, the method comprising the steps of: providing a plurality of diversity mode performance chart look-up tables, each performance chart look-up table mapping a respective individual diversity mode out of a plurality of individual diversity modes to a respective pair of time correlation value and space correlation value for said two cross-polarized antenna array beams, wherein a respective individual diversity mode is presented by a mapping area, wherein the plurality of performance chart look-up tables is parameterized by an indication of a ratio of received powers from said diversity branches, and the mapping is different for different performance charts, first determining the ratio of received powers from said diversity branches, second determining the actual rime correlation and space correlation for said pair of two cross-polarized antenna arrays, first selecting one of said performance chart look-up tables dependent on determined ratio of received powers from separate beams, and second selecting one of said individual diversity modes according to the mapping to the determined actual time correlation and space correlation values from said first selected performance chart look-up table.

According to favorable further developments
said selected diversity mode is selected for each individual link established by the transmitter;

said mapping of diversity modes differs for different performance chart look-up tables dependent on the determined ratio of received powers from said diversity branches;

said diversity modes are classified as open-loop diversity modes and closed-loop diversity modes, and said determined ratio of received powers is applied as a further control parameter for controlling said closed-loop diversity modes when activated upon selection;

said diversity modes are classified as open-loop diversity modes and closed-loop diversity modes, and a mapping area of at least one closed-loop diversity mode increases dependent on the indication of a ratio of received powers from said diversity branches;

said first determining and said second determining are performed at said transmitter;

providing said performance chart look-up tables is effected beforehand based on simulation results and/or measurement cycles; and both arrays consists of one antenna element and antenna calibration in the transmitter is performed by using both the feedback from said receiver according to one of the closed-loop modes, and the received signals from cross-polarized antenna arrays in the transmitter.

By virtue of the present invention, basically the following advantages can be achieved The present invention provides a new solution for diversity mode selection to be used in two-antenna array transmit diversity systems, in particular those using cross polarized antenna arrays.

The present invention provides means to combine polarization matching and present WCDMA transmit diversity modes.

The mode selection procedure depends on the difference between average received powers, so that the appropriate look-up table may be selected resulting in improved diversity performance, The present modes (in limits given by standards) can be enhanced as they take into account the difference between average received powers.

Thus, this invention improves the present solutions in two ways in that firstly, it provides means to combine polarization matching with present transmit diversity modes, and secondly, it provides a new transmit diversity selection procedure that is based on BS measurements.

BRIEF DESCRIPTION OF THE DRAWINGS

In the following, the present invention will be described in greater detail with reference to the accompanying drawings, in which.

DETAILED DESCRIPTION OF THE EMBODIMENTS

Figure 1:
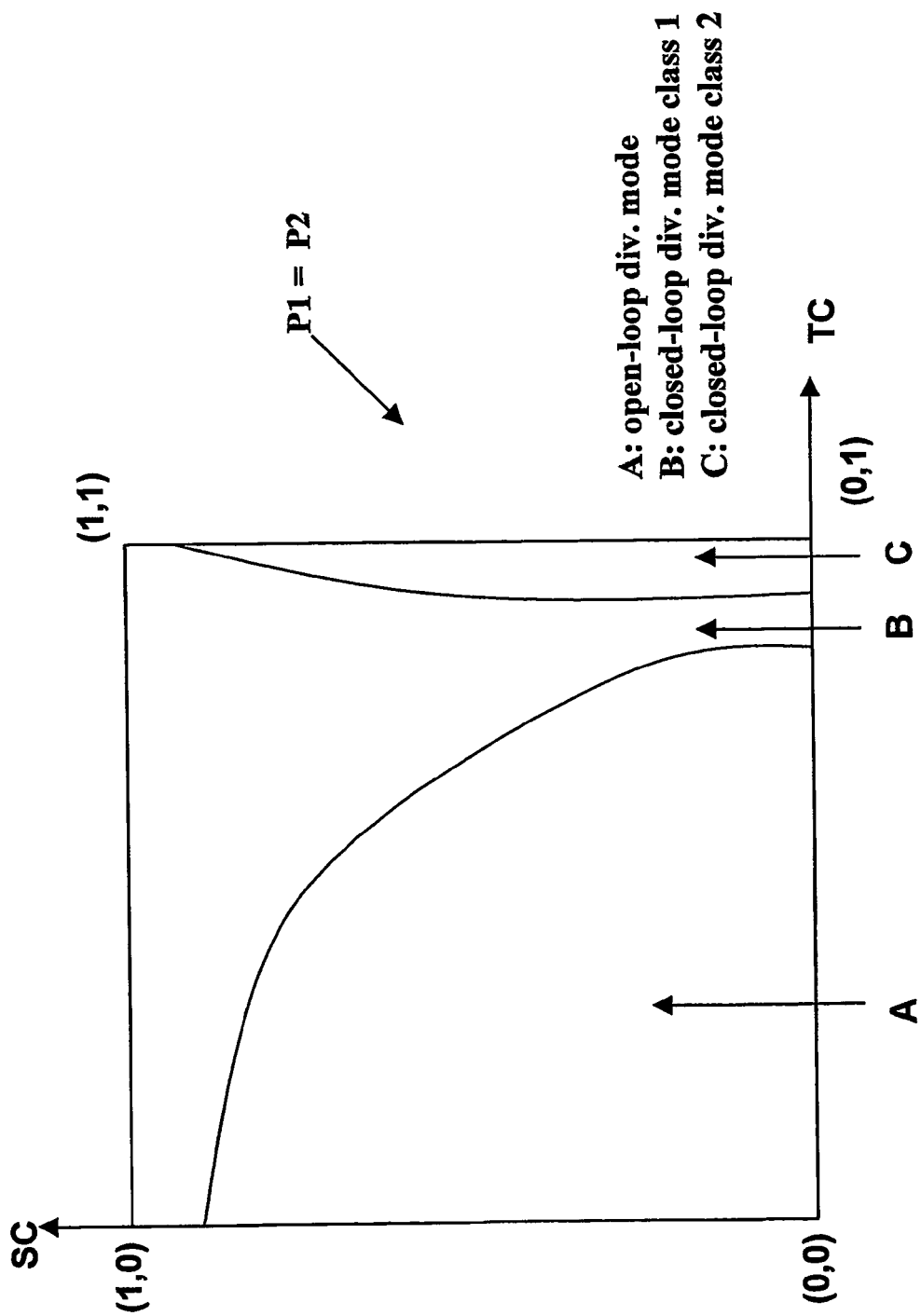
FIG. 1 shows a diversity mode performance chart look-up table mapping a respective individual diversity mode out of a plurality of individual diversity modes to a respective pair of time correlation value and space correlation value, under the assumption that the ratio of received powers equals 1.

In the following, the proposed mode selection procedure according to the present invention is outlined. It is to be noted that in the be low procedure all steps are performed in the transmitter (e.g. BS). The procedure as such basically comprises the following steps when selecting a diversity mode A, B, C to be applied by a transmitter having two cross-polarized antenna arrays Ant1, Ant 2, each representing a diversity branch, for transmission diversity.

Firstly, a plurality of diversity mode performance chart look-up tables LUT, LUT1, LUT2, LUT3 are provided, step S10. Each performance chart look-up table maps a respective individual diversity mode A, B, C out of a plurality of individual diversity modes to a respective pair of time correlation value TC and space correlation value SS for said two cross-polarized antennas, and a respective individual diversity mode is presented by a mapping, area (in the chart). The plurality of performance chart look-up tables is parameterized by an indication of a ratio P1/P2 of received powers (at the receiver side) from said diversity branches, and the mapping is different for different performance charts. The look-up tables have been formed beforehand, i.e. before the actual selection process starts.

Subsequently, there is a first determining step, S11, for determining the ratio of received powers from said diversity branches. This determination can be effected by computing the ratio between average received powers from separate antenna branches. Namely, the receiver UE transmits in uplink direction UL feedback information FBI indicating the relative phase of the signals transmitted/received received from the antenna branches, and from this information, the transmitter can in turn deduce the relative strength, i.e. received power. The average received power is obtained by averaging the information on the relative strength/power received from a plurality of receivers (mobile station and/or user equipment), as each FBI concerns a certain receiver only.

Next, in a second determining step S12, the actual time correlation TC and space correlation SC for said pair of cross-polarized antennas is performed. This can be accomplished by computing the channel time correlation employing the data from both receiver antenna branches by using any known method, and likewise, also by computing the spatial correlation between antennas by using received data and any known method. The computation of the time correlation of signals can be done, for example, in the transmitter based on the equation $$TC(d) = \frac{E\{x(t)^*x(t-d)\}}{\sqrt{E\{|x(t)|^2\}E\{|x(t-d)|^2\}}}$$

where x(t) is the received signal in the transmitter at time instant t, x(t−d) is the received signal in the transmitter at time instant t−d and E $\{\cdot\}$ is the expectation. Expectations can be estimated using IIR or FIR filters. The symbol "*"

denotes the conjugate complex value. The correlation between antenna branches can be done based on the equation $$SC = \frac{E\{x1(t)^* x2(t)\}}{\sqrt{E\{|x1(t)|^2\} E\{|x2(t)|^2\}}}$$

where x1(t) is the received signal in the transmitter antenna 1 at time instant t, x2(t) is the received signal in the transmitter antenna 2 at time instant t and $E\{\cdot\}$ is the expectation. Again, suitable IIR or FIR filters can be used in order to estimate the expectations, and the symbol "*" denotes the conjugate complex value.

Based on those spatio-temporal correlation values and power ratio determined as described above, a decision can then be taken on the most suitable diversity mode to be used and/or activated for diversity transmission, the decision using the look-up table LUT consisting of plural individual look-up tables LUT1, LUT2, LUT3 that have been formed beforehand.

Namely, there is performed a first selecting step S13 of one of said performance chart look-up tables dependent on determined ratio P1/P2 of received powers, i.e. for example LUT2 is selected because the ratio P1/P2 is in the range of 3 . . . 6 dB for which LUT2 is applicable, and thereafter a second selecting step S14 of one of said individual diversity modes A, B, C according to the mapping to the determined actual time correlation TC and space correlation SC values from said first selected performance chart look-up table is performed. Stated in other words, considering that LUT2 resembles the performance chart shown in FIG. 2, assuming that (TC;SC) has a value of about (0,9;0,9), for example, there the value pair lies within the mapping area denoted by arrow C and the closed-loop diversity mode of class 2 would be selected.

Thus, the principle of mode selection has become clear from the above explanations of the provisioning, determination and selection steps. Known algorithms can be used in the determination steps while the provisioned look-up table can be established based on simulations and/or the transmitter tests.

Figure 5:
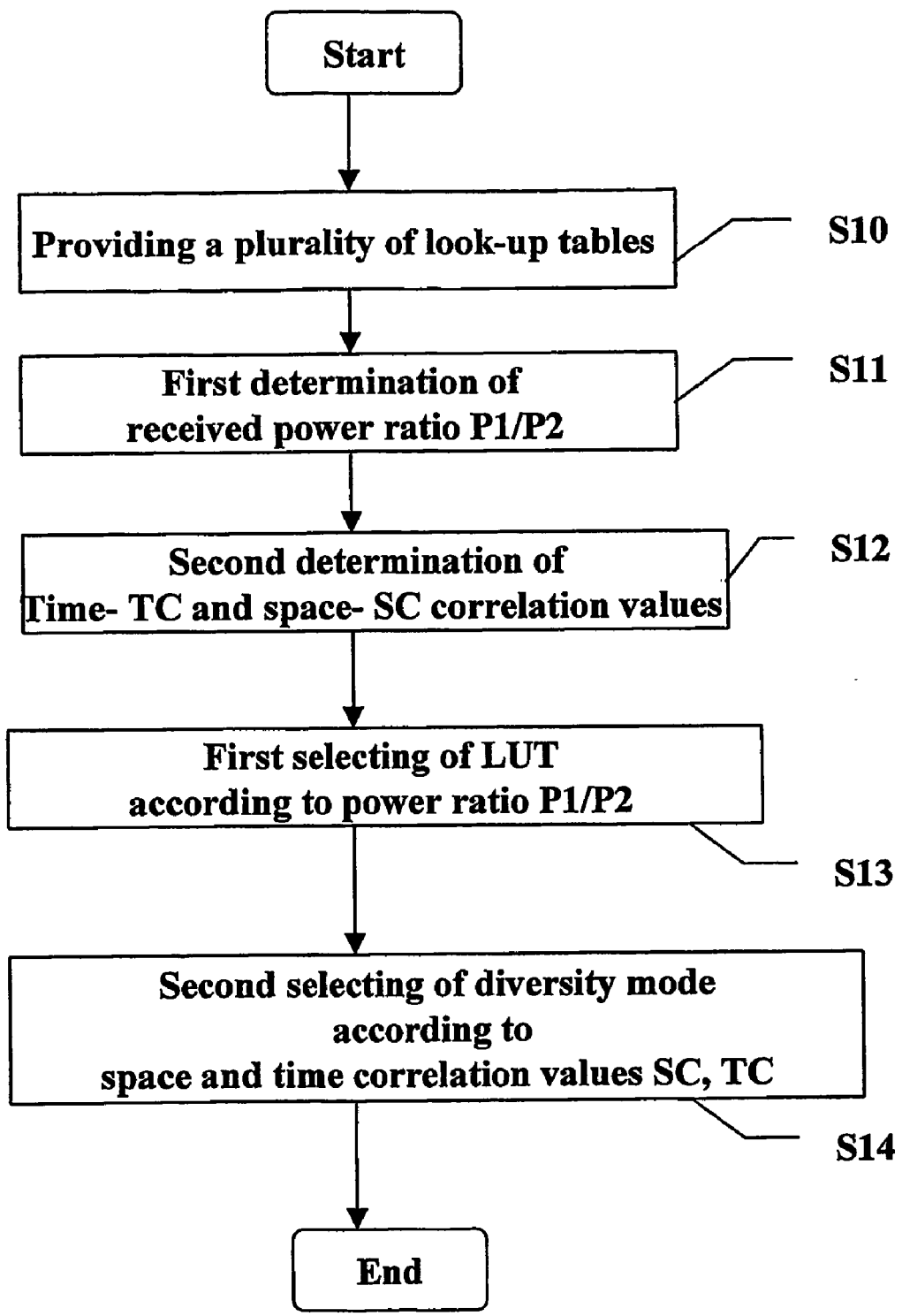
FIG. 5 is a flowchart illustrating the method according to the present intention.

FIG. 5 represents the above explained method steps as a corresponding flowchart diagram.

Figure 2:
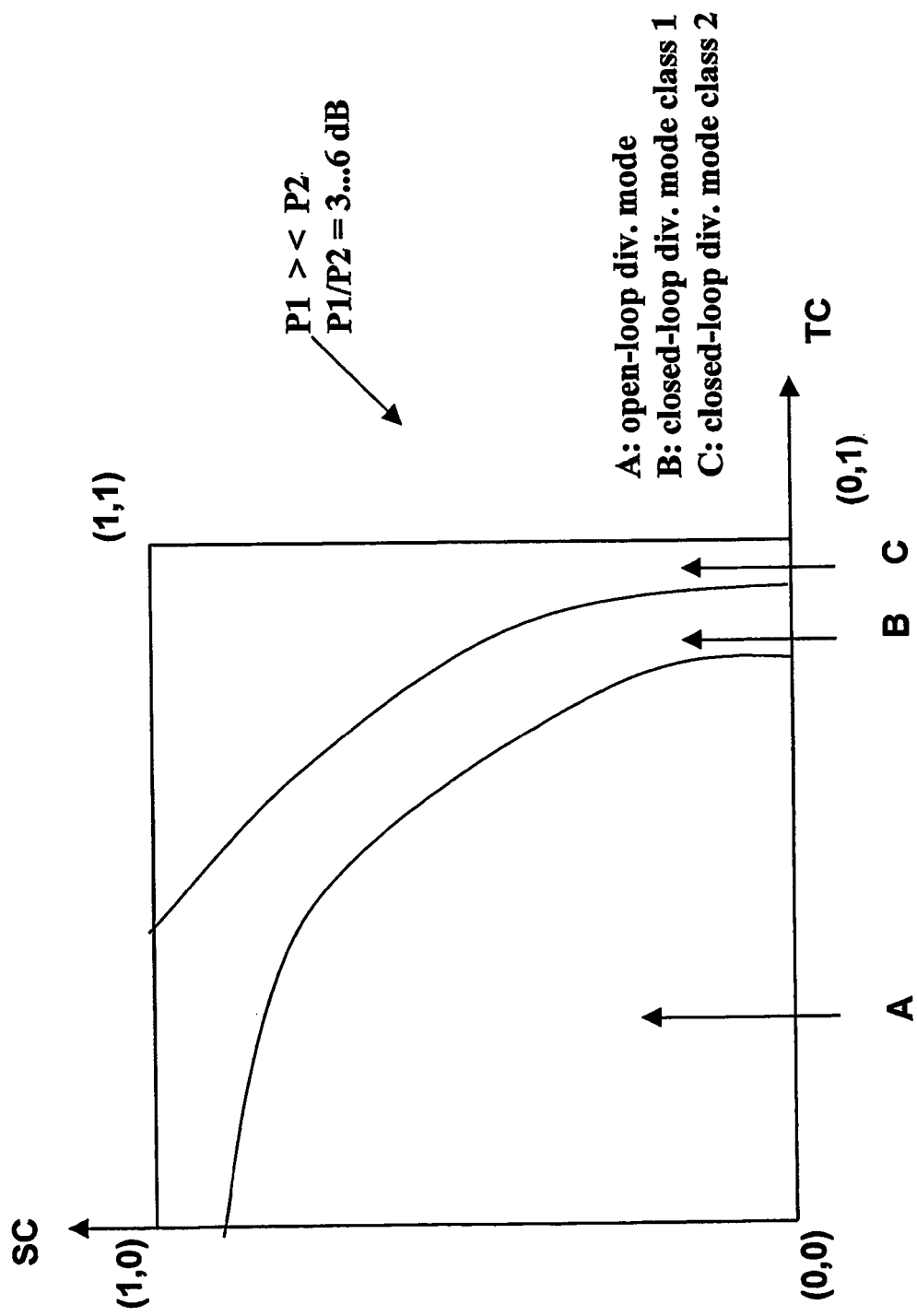
FIG. 2 shows a diversity mode performance chart look-up table mapping a respective individual diversity mode out of a plurality of individual diversity modes to a respective pair of time correlation value and space correlation value, under the condition that the ratio of received powers is unequal to 1, and rather is in the range of for example 3 to 6 dB.
Figure 3:
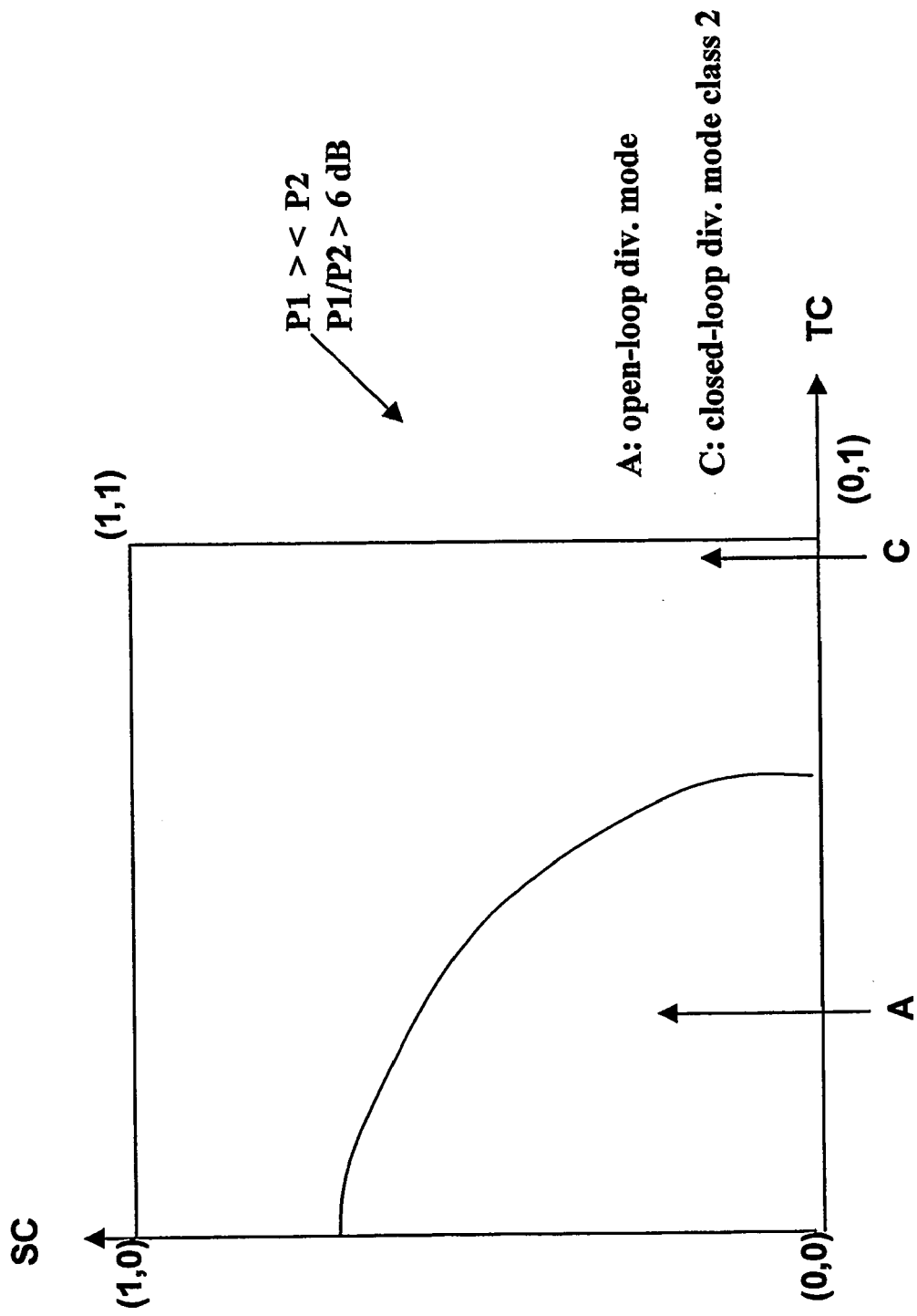
FIG. 3 shows a diversity mode performance chart look-up table mapping a respective individual diversity mode out of a plurality of individual diversity modes to a respective pair of time correlation value and space correlation value, under the condition that the ratio of received powers is unequal to 1, and rather is in the range of for example greater than 6 dB.

Accordingly, the mode selection procedure according to the present invention can be based, as derivable from FIGS. 1, 2 and 3, on three measures and/or parameters that can be used in mode selection, namely: time-correlation correlation TC between signals from separate antennas, spatial correlation SC between separate antennas and the ratio between average received signal powers P1/P2. There are, of course other measures too, but the inventors emphasize the given measures since
they are essential from a performance point of view,
they can be computed in BS and
most (or even all) other important measures (MS velocity etc.) can be derived from the given measurement set.

According to a modification, the closed-loop diversity mode of class 2 can be enhanced. Namely, as mentioned before, said diversity modes axe classified as open-loop diversity modes A, and closed-loop diversity modes B, C, and said determined ratio of received powers P1/P2, according to the modification, is applied as a further control parameter for controlling said closed-loop diversity modes when activated upon selection.

This will subsequently be explained in greater detail. In the present class 2 closed-loop modes, the receiver (MS or UE) estimates the channels from two different CPICHs and selects the best transmit weight combination from a standardized quantization set. Then receiver transmits the feedback information (4 bits) to the BS via a control channel (e.g. DPCCH). In the transmitter such as the BS or Node_B, the suitable weights are selected and/or generated based on the feedback. Finally, the receiver MS may use a certain verification algorithm by which it confirms that the transmitter BS has used correct weights (see for example R1-00-1087, verification algorithm for closed-loop transmit diversity mode 2, TSG ELAN WG1, August, 2000). If there are feedback bit errors, then weights used by the transmitter BS are not those that were asked by the receiver MS, but verification algorithm will find this out and correspondingly change its weights (in channel estimation based on the common pilots, i.e. CPICH's).

If, however, cross-polarized antenna arrays (and/or antennas) are used, then the following enhancement can be used.
1. The receiver estimates the channel, forms the feedback and transmits it to the transmitter as in the present closed-loop mode of class 2.
2. The Transmitter uses the standardized quantization in weight selection. However, it does not use the receiver feedback directly, but instead, it employs both the feedback received from the receiver as well as uplink measurements in connection with weight selection.
3. MS verifies the weights that are used by ES.
4. BS verifies that employed weights are suitable.

Various possibilities in regard of detailed algorithm proposals for such an enhanced control can be presented, which may vary dependent on measurement campaign results conducted for specific environments and transmitters. However, basically it should be noted that the received power and/or average received power is to be used as are additional control parameter for weight selection in diversity transmission.

According to a basic implementation of the enhanced modification, the transmitter BS/Node_B computes the average received powers P1 and P2 of some certain link from separate antenna branches and uses the ratio P1/P2 in weight selection. The weight computation can also be based on the relative phase information received via the FBI bits from a certain receiver. The received FBI information concerning to a certain radio link can be either used directly or it can be filtered before it is used.

According to an alternative implementation of this aspect, in many environments the amplitude (and in some cases even phase) weight selection can be based on uplink measurements when cross-polarized antennas are used. For example, received signal powers from separate antennas can be filtered as follows, $P1(t)=aP10+(1-a)P1(t-1)$ $P2(t)=aP20+(1-a)P2(t-1)$ where P1(t) is the filtered power from antenna 1 at time t, P10 is the instant power from antenna 1, P1(t−1) is the filtered power from antenna 1 at time t−1, P2(t) is the filtered power from antenna 2 at time t, P20 is the instant power from antenna 2, P2(t−1) is the filtered power from antenna 2 at time t−1 and a is a filtering parameter. When the channel preserves the transmitted polarization, it can be seen from uplink measurements when observing the ratio p1/p2: If the ratio p1/p2 is not equal to unity, then channel preserves the transmitted polarization at least partly and it can be utilized when downlink transmit weights are selected. In some cases the channel preserves also the relative phase between transmitted (and received) signals.

The transmitter verification can be based on the averaged FPC (Fast Power Control) bits that are received from the receiver. Thus, the proposed enhanced class 2 closed-loop diversity mode does not need any standard changes. The performance can be further improved by extending the definition of the field of applicability of the class 2 closed-loop diversity mode in the standard. Namely, the standard commands to send 80% of the power from the better channel and 20% of the power from the other one. However, if the power imbalance is large, it is better to transmit from one antenna only. Stated in other words, depending on a threshold of power imbalance, diversity is then switched off. Optional transmit weight verification in the receiver side should still be viable if the changes in power allocation based on uplink measurements are smooth enough.

Next the benefit obtained by the proposed enhancement is illustrated. Assume that cross-polarized antenna arrays are used and ratio p1/p2 of received powers from separate polarization branches is relatively large (currently, there are no simulation results yet available and therefore FIG. 2 is based on theoretical considerations). It is assumed that here 'relatively large' means 3–6 dB's). Then the performance chart has the form given in FIG. 2 (now C refer to enhanced class 2). It is seen that the operating area of enhanced class 2 has been increased. This is mainly because enhanced class 2 begins to work better when ratio p1/p2 increases. Moreover, there are not as many wrong decisions corresponding to amplitude weights when enhanced class 2 is used. This is especially true when spatial correlation is high. In FIG. 3 there is illustrated the performance chart when the ratio of received powers from separate polarization branches is large (>6 dB's). It is seen that enhanced class 2 begins to dominate when power ratio increases. In fact, when ratio p1/p2 is (very) large (6 dB corresponds to a ratio of P1/P2=4/1), then enhanced class 2 may be the most feasible mode for all spatio-temporal temporal correlation values. This is, however, an extreme case.

When enhanced class 2 is used, transmit weight selection may be based on both receiver feedback and uplink measurements. This means that antennas need to be calibrated. For calibration, a method as explained further below can be used.

However, there is also an other way that may be faster and more accurate, which is described in the following. We emphasize that the subsequently proposed calibration procedure neither need any additional hardware in BS, nor any standard changes.

Basically, every antenna array is provided with an equipment for modifying the baseband signal so that the signal leaving the antenna array to the physical layer, i.e. the air interface in radio transmission systems, is known. When there are two transmit antennas and also two transmit chains, this means that two basebands, two D/A converter, two power amplifiers etc. are provided, thus establishing two RF chains, one chain per antenna.

However, even though each chain is similar in design, the used components are actually slightly different because of their non-ideal characteristics. Hence, also the signal leaving the antenna system is not the same per antenna, even if controlled by the identical control signals. As a consequence, signal phase between the signals of the chains is not preserved in the RF chains. Accordingly, a phase compensation by means of applying a transmit weight at the baseband side has to be effected for compensating the phase error. Determination of the weight to be applied represents the calibration problem.

To this end, just before the antenna, a receiver means (still at the transmitter) is provided, which measures the transmitter's own signal. Based on this, the non-idealities are determined and the weight for compensation is deduced.

For the proposed calibration, such receivers are selected for which the channel preserves well the polarization. This will make the calibration more reliable. If there are none, then the enhanced class 2 is not used (it is not feasible) and calibration is not necessarily needed. (Preservation of polarization can be recognized from the received power ratio p1/p2.)

By averaging received signal powers and relative phases between polarization branches, suitable transmit weights for downlink transmission are found (for each link separately). But these weights are not used immediately.

Then, comparison is effected of (a) the transmit weights that are formed using received feedback commands and (b) transmit weights that are formed using polarization measurements. The possible difference in the transmit weights is the error that needs to be compensated by calibration. Since several receivers (at least one) is connected into the calibration process, the resulting calibration constants (same for all mobiles) are obtained using the average differences in transmit weights. This calibration procedure is fast and no additional hardware is needed. If closed loop diversity mode class 1 is employed, then the relative phase between transmit chains can be calibrated as explained. Relative transmit power can be calibrated when class 2 is employed, at least for some links.

For example, if closed-loop mode class 1 is employed, we can do the calibration as follows: assume that K receivers are connected to the calibration. Receivers are selected such that correlation between antennas is high. This is, for example, the case if there is strong line-of-sight (LOS) component in the received signal. For the relative phases there holds $$\Delta\phi_{UL,ANT}^k = \Delta\phi_{UL,DSP}^k + C_{UL}$$

$$\Delta\phi_{DL,ANT}^k = \Delta\phi_{DL,DSP}^k + C_{DL} \quad (1)$$

Where left side of the equation is the relative phase between signals when signals leave the antennas, first term in the right side of the equation is the relative phase of signals seen in digital signal processing (DSP) unit before transmission and the last term in the right is the calibration constant. First equation corresponds to the receiver chains while second equation corresponds to the transmitter chains. Index k refers to the receiver. If antennas are correlated we should have $$\Delta\phi_{UL,ANT}^k \Delta\phi_{DL,ANT}^k \quad (2)$$

Then transmitted signals are summed coherently in the direction of the receiver k. If closed-loop mode class 1 is used this equation is approximately true. Then we obtain $$\Delta\phi_{UL,DSP}^k - \Delta\phi_{DL,DSP}^k = \Delta\phi_{UL,ANT}^k - \Delta\phi_{DL,ANT}^k + C_{DL} - C_{UL} \quad (3)$$

Now the difference between calibration constants is estimated using equation $$C_{UL} - C_{DL} \approx \frac{1}{K}\sum_{k=1}^{K}(\Delta\phi_{DL,DSP}^{k} - \Delta\phi_{UL,DSP}^{k}) \quad (4)$$

After estimating the difference between calibration constants we can select the relative phase for transmission using the equation $$\Delta\phi_{DL,DSP}^{k} = \Delta\phi_{UL,DSP}^{k} + C_{UL} - C_{DL} \quad (5)$$

Hence, only UL measurements are needed any more. Calibration needs to be updated once and a while. Update time is system related.

Figure 4:
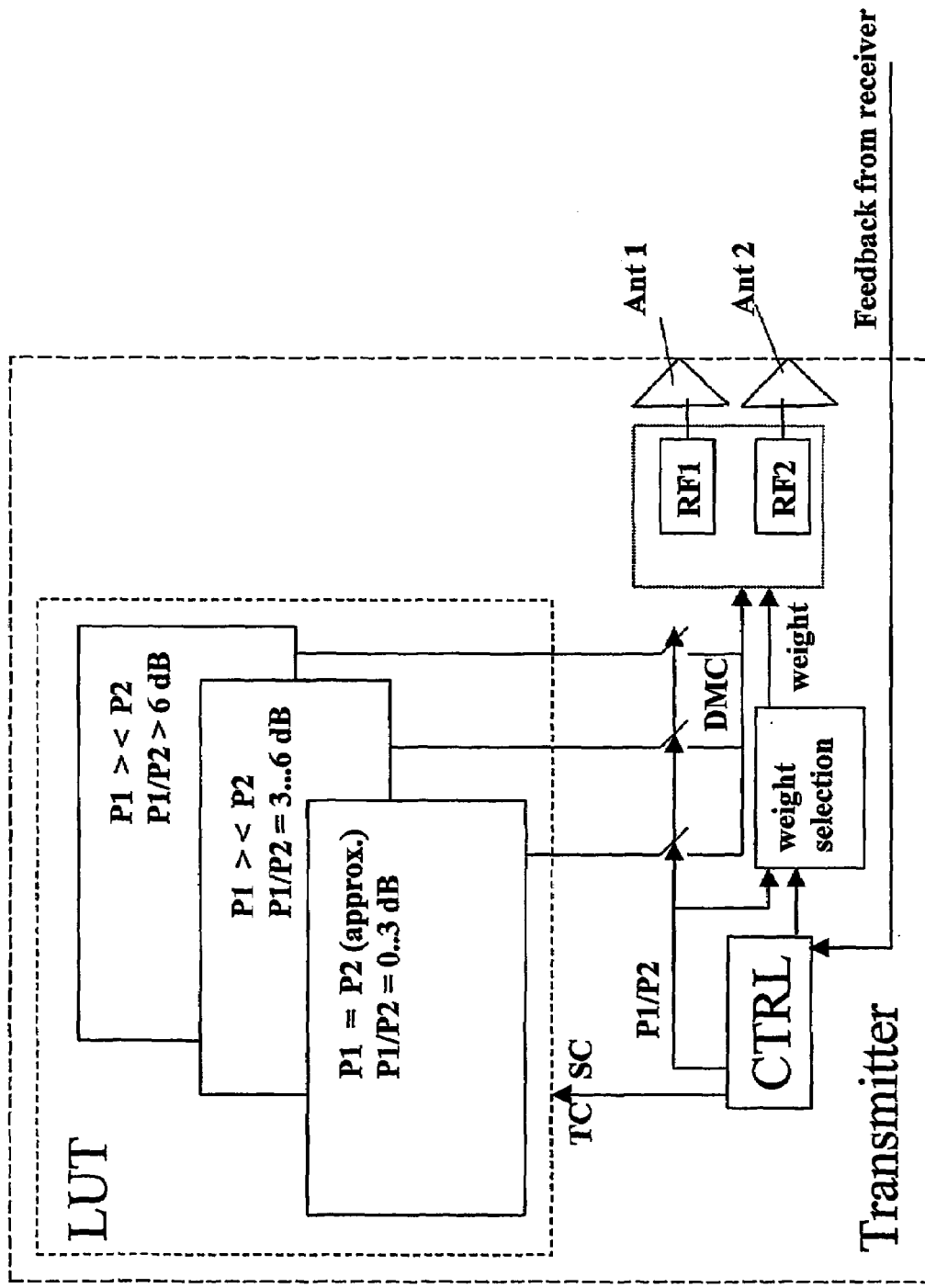
FIG. 4 is a simplified block diagram of a transmitter with the present invention being implemented.

FIG. 4 shows a transmitter implementing the present invention, i.e. the method for diversity mode selection, the method for controlling the mode to an enhanced mode, and the calibration method. However, please note that details of implementation are omitted and that FIG. 4 shows merely a basic functional block diagram, while even omitting details concerning the calibration process in order to keep the description simple.

As shown in FIG. 4, the transmitter comprises a look-up table LUT, which itself consists of a plurality of look-up table performance charts LUT1, LUT2, LUT3. For example, LUT3 and LUT2 may have a contents as represented in FIGS. 3 and 2, respectively, while LUT1 may have a contents basically as represented in FIG. 1. (Note that FIG. 1 illustrates a case for P1/P2, while LUT1 in FIG. 4 is intended to be used for a range of P1/P2=0 . . . 3 dB). Further look-up table performance charts may be used and/or the power ratio ranges may vary from those indicated in FIG. 4. Furthermore, the transmitter comprises two diversity antennas Ant1 and Ant2, each preceded by an RF chain RF1, and RF2, respectively.

The RF chains are controlled by applying at least a weight signal, output from a weight selection means. The weight selection means is at least controlled by a control signal output from a control means CTRL. The output of the control means CTRL is dependent on feedback information received from a receiver (not shown). (Basically, this weight control arrangement as described so far corresponds to prior art).

The control means receives the feedback information and determines a control signal for weight selection. In addition, the control means also determines the ratio of received powers P1/P2 and the space correlation SC and time correlation TC values. This determination can be based on the received feedback information and determined by calculation, or may be based on uplink measurements.

The determined ratio P1/P2 is applied for controlling the selection of one of the look-up table performance charts LUT1 to LUT3 dependent on P1/P2. (This is indicated by the controlled switch controlled by P1/P2.) Once a look-up up table performance chart is selected, the parameters TC and SC are applied to select the appropriate diversity mode therefrom, indicated in the performance chart for this parameter pair. The thus selected diversity mode is then activated by applying a diversity mode control signal DMC to the RF chains. (Note that the selection order can also be exchanged, i.e. first TC/SC selects in each of LUT1 to LUT3 a mode to be selected, and one of the thus pre-selected modes is then selected based on P1/P2.) Additionally, the power ratio P1/P2 may also be applied for weight selection, as shown in FIG. 4.

Accordingly, as has been described herein before, the present invention concerns a method for selecting a diversity mode A, B, C to be applied by a transmitter having two cross-polarized antenna arrays Ant1, Ant 2, each representing a diversity branch, for transmission diversity, the method comprising the steps of: providing S10 a plurality of diversity mode performance chart look-up up tables LUT, LUT1, LUT2, LUT3, each performance chart look-up table mapping a respective individual diversity mode A, B, C out of a plurality of individual diversity modes to a respective pair of time correlation value TC and space correlation value SC for said two cross-polarized polarized antenna array beams, wherein a respective individual diversity mode is presented by a mapping area, wherein the plurality of performance chart look-up tables is parameterized by an indication of a ratio P1/P2 of received powers from said diversity branches, and the mapping is different for different performance charts, first determining S11 the ratio of received powers from said diversity branches, second determining S12 the actual time correlation and space correlation for said pair of two cross-polarized antenna arrays, first selecting S13 one of said performance chart look-up tables dependent on determined ratio P1/P2 of received powers from separate beams, and second selecting S14 one of said individual diversity modes A, B, C according to the mapping to the determined actual time correlation TC and space correlation SC values from said first selected performance chart look-up table.

While the invention has been described with reference to a preferred embodiment, the description is illustrative of the invention and is not to be construed as limiting the invention. Various modifications and applications may occur to those skilled in the art without departing from the true spirit and scope of the invention as defined by the appended claims.

The invention claimed is:

1. A method for selecting a diversity mode (A, B, C) to be applied by
   a transmitter
      having two cross-polarized antenna arrays (Ant1, Ant 2), each representing a diversity branch,
   for transmission diversity,
the method comprising the steps of:
   providing (S10) a plurality of diversity mode performance chart look-up tables (LUT, LUT1, LUT2, LUT3),
   each performance chart look-up table mapping
      a respective individual diversity mode (A, B, C) out of a plurality of individual diversity modes to a respective pair of time correlation value (TC) and space correlation value (SC) for said two cross-polarized antenna array beams,
   wherein a respective individual diversity mode is presented by a mapping area,
   wherein the plurality of performance chart look-up tables is parameterized by an indication of a ratio (P1/P2) of received powers from said diversity branches, and
   the mapping is different for different performance charts,
   first determining (S11) the ratio of received powers from said diversity branches,
   second determining (S12) the actual time correlation and space correlation for said pair of two cross-polarized antenna arrays,
   first selecting (S13) one of said performance chart look-up tables dependent on determined ratio (P1/P2) of received powers from separate beams, and
   second selecting (S14) one of said individual diversity modes (A, B, C) according to the mapping to the determined actual time correlation (TC) and space correlation (SC) values from said first selected performance chart look-up table.

2. A method according to claim 1, wherein said selected diversity mode is selected for each individual link established by the transmitter.

3. A method according to claim 1, wherein
said diversity modes are classified as open-loop diversity modes (A) and closed-loop diversity modes (B, C), and
said determined ratio of received powers is applied as a further control parameter for controlling said closed-loop diversity modes when activated upon selection.

4. A method according to claim 1, wherein
said first determining and said second determining are performed at said transmitter.

5. A method according to claim 1, wherein
providing said performance chart look-up tables is effected beforehand based on simulation results and/or measurement cycles.

6. A method according to claim 1, wherein
both arrays consists of one antenna element and antenna calibration in the transmitter is performed by using both the feedback from said receiver according to one of the closed-loop modes, and the received signals from cross-polarized antenna arrays in the transmitter.

7. A method according to claim 1, wherein
said mapping of diversity modes differs for different performance chart look-up tables dependent on the determined ratio of received powers from said diversity branches.

8. A method according to claim 7, wherein
said diversity modes are classified as open-loop diversity modes and closed-loop diversity modes, and
a mapping area of at least one closed-loop diversity mode (C) increases (FIG. 2, FIG. 3) dependent on the indication of a ratio of received powers from said diversity branches.

* * * * *